Patented May 26, 1953

2,640,039

UNITED STATES PATENT OFFICE 2,640,039

RESINS CAPABLE OF PRODUCING VISCOUS AQUEOUS SOLUTIONS AND METHOD FOR THE MANUFACTURE THEREOF

John C. Williams, St. Charles, Ill., assignor to Hawley Products Company, St. Charles, Ill., a corporation of Delaware No Drawing. Application February 20, 1947, Serial No. 729,874

15 Claims. (Cl. 260—23)

This invention relates to synthetic resins which are soluble in aqueous solutions and specifically to a novel method whereby such resins are modified so their aqueous solutions are of higher viscosity and gel at lower concentrations.

By the use of the ethenoid or vinyl type of polymerization, linear molecules of high molecular weight may be synthesized. Under certain circumstances the resins so produced are soluble in weak acid, alkali or in water.

Solubility in aqueous solvent depends on, (a) not exceeding a certain molecular weight and, (b) on providing recurring hydrophilic groups along the molecule. Manipulation of molecular weight is possible in a number of ways; e. g. increasing the rate of reaction during polymerization, or use of a diluent, usually decreases the molecular weight. Recurring hydrophilic groups may be provided by polymerizing or copolymerizing suitable monomers. In certain cases chemical treatment may be carried out after the polymerization to produce the desired groups. Vinyl acetate is polymerized to polyvinyl acetate, and the polymer is treated with acid or alkali to remove acetate groups and produce hydrophilic hydroxyl groups. The polyvinyl acetate is water insoluble, whereas the polyvinyl alcohol readily dissolves in water. Maleic anhydride may be copolymerized with styrene or vinyl acetate, or other ethylenic derivatives, to give resins which after digestion to open the anhydride ring are soluble in aqueous solvent.

Acrylonitrile may be used in polymerization to place the cyanide grouping along the molecular chain. The cyanide group may be reduced to give amino groups or hydrolyzed to give amido or carboxyl groups. All of these three function as hydrophilic groups.

In the present invention, the principles set forth above on the production of resins soluble in aqueous solvent are followed. It has been found however, that if a cross linking agent, one containing two or more aliphatic carbon to carbon double bonds in the molecule, is included in the polymerization, new and valuable properties appear in the resins.

Among the objects of my invention is to provide materials which may be used as thickeners and sizes in aqueous solution.

Another object of my invention is to provide resins soluble in aqueous solvent which are modified to give solutions of higher viscosity.

A further object is to provide resins soluble in aqueous solvent modified to give aqueous solutions which gel at low concentrations.

A still further object is to provide materials which may be used as protective colloids and dispersing agents in aqueous solutions.

Another object is to provide film-forming agents which are soluble in aqueous solvent.

A further object is to synthesize a substitute for various gums.

Other objects and advantages and capabilities will later more fully appear.

The resin to be soluble in aqueous solvent must have a certain per cent of hydrophilic groups distributed along the molecule and the molecular weight must not be too great. The use of a cross linking agent imposes difficulties which have been successfully overcome in the present invention. A great number of cross linking agents are available, e. g. divinyl ether, divinyl sulfide, isoprene, vinyl methacrylate, ethylene glycol dimethacrylate, linseed oil, dehydrated castor oil, tung oil, and the like. It is necessary also to determine the optimum concentration of cross linking agent to use. Too low a concentration will give a water dispersible or soluble resin of poor thickening power, while too great a concentration will give a resin which is no longer water dispersible or soluble. In certain cases the rate of solution, which in general decreases with increase in extent of cross linking, may make a low amount of cross linking desirable. It should also be kept in mind that an optimum concentration of cross linking agent will have to be revised if the concentration at which the polymerization is carried out is changed, or if the conditions of the reaction are changed.

The relative quantities of maleic anhydride (or other hydrolyzable constituent, e. g. vinyl cyanide) may vary somewhat but should preferably be at least 10% and not more than 75%, on a molal basis, of the quantity of vinyl monomer (e. g. vinyl esters such as vinyl acetate or styrene). Good results have been obtained in the range 10% to 40% on this basis. This leaves unsaturated portions of the vinyl monomer free for polymerization or further reaction with the cross linking agent. The total molal quantity of the cross linking agent and hydrolyzable constituent is preferably at least 25% but less than 50% of the vinyl monomer, although in some cases where the upper limit of the hydrolyzable constituent has been used (e. g. Example IV) an excess of the cross linking agent has been employed. Preferably the quantity of the cross linking agent is around 1% to 25%, on a molal basis, of the vinyl monomer. The vinyl monomer used as a starting material contains a single

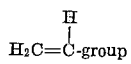
$H_2C=C$-group

The cross linking agent may contain two or more such groups (e. g. isoprene, butadiene 1,3, divinyl ether, divinyl benzene). The quantity of cross linking agent available for reaction with the vinyl monomer on a molal basis, after allowing for the reaction of the hydrolyzable constituent, is not more than 25% (even though an excess is employed).

In view of these many variables, and of the many possibilities which are apparent from the foregoing, the following examples are to be construed in an illustrative sense, and not as limiting my invention:

*Example I*

157 grams vinyl acetate, 23.5 grams maleic anhydride, 35 grams divinyl ether and 0.2 gram benzoyl peroxide were heated 1 hour at 65° C. The white powder obtained was dissolved in dilute ammonia to give a water white clear solution. This solution was gelled in as low a concentration as 0.1 per cent solids. No discharge at this concentration could be obtained from a 25 cc. pipette. This soluble cross linked resin gives much thicker solutions than the original copolymer of maleic anhydride and vinyl acetate (made under the same conditions as the above mentioned cross linked resin) without cross linking agent, which original discharged, in a 3.5 per cent solution, from the 25 cc. pipette in 45 minutes. Glycerol required 19 minutes, and water 35 seconds under the same conditions.

In Example I vinyl acetate is used as an ethylenic derivative with a hydrophobic side group. The maleic anhydride is used as the monomer which has a grouping which can be readily made hydrophilic and divinyl ether is used as the cross linking agent. Benzoyl peroxide is the catalyst. It should be observed that a portion of the vinyl acetate functions as a solvent and without a certain amount of solvent insoluble products would be obtained from the polymerization. When the polymer is placed in contact with dilute ammonia, the anhydride ring which is spaced along the molecule opens to give the ammonium salt of the resin.

*Example II*

100 grams vinyl acetate, 10 grams maleic anhydride, 4 grams raw linseed oil and 0.2 gram benzoyl peroxide were heated under reflux for 1 hour. 30 grams of white powder formed which dissolved in dilute ammonia. This solution was gelled at 1.2% T. S. (total solids). It was noted that the thickening power of the resin was permanently increased by heating the powder at 100° C. for two hours in the presence of air. This indicates that under these conditions cross linking can be carried further. This also applies in varying degrees to the other examples set forth herein.

In Example II the vinyl acetate functions as an ethylenic derivative with a hydrophobic side group. The maleic anhydride is used as the monomer which has a grouping which can be readily made hydrophilic. The linseed oil is used as the cross linking agent in the polymerization. This example is of importance because I am using a cheap and readily available cross linking agent. The question of whether the resin would be heated as carried out in this example would depend upon the degree of cross linking already present. Under certain circumstances further cross linking would result in insolubilizing the resin which is not desired in this example. In certain cases, however, it may be advantageous to form the resin with a minor amount of cross linking and to complete the cross linking to the optimum extent by heating the dry material. This procedure also has the advantage of reducing the degree of unsaturation of the resin.

*Example III*

78 grams vinyl acetate, 12 grams maleic anhydride, 10 grams isoprene, 300 grams ethyl acetate and 0.3 gram benzoyl peroxide are refluxed two hours. A white precipitate forms which is filtered and washed with ethyl acetate. Yield 8.4 grams: (this is low because of side reactions). The precipitate is dissolved in dilute ammonia, forming a 1.3% solution which is highly viscous. When the solution is evaporated to dryness a resinous material is deposited which is tough and strong while dry. After standing a short time at room humidity the resin becomes weak and highly extensible.

The ammonia solution is made strongly acid with hydrochloric acid and boiled three hours. The resin is precipitated, is filtered, washed and redissolved in dilute ammonia. This solution is highly viscous and gelled at 0.38% T. S. The resin solids from this solution do not become weak or extensible at room humidity.

In Example III a copolymerization has been carried out as in the previous examples, but in this case a 1-3 diene (isoprene) has been used as the cross linking agent. Ethyl acetate functions as a solvent to keep the molecular weight of the resin down and so make it soluble or dispersible in water, and the benzoyl peroxide serves to initiate the polymerization reaction. In the first step of the example, the anhydride ring contributed by the maleic anhydride is opened and the soluble ammonium salt of the resin is formed. This particular product was very much like a water soluble rubber but was only rubber-like in the presence of water as a plasticizer. In the step of acidifying the ammonia solution and heating, the acetate groups are hydrolyzed from the resin. This is a case in which two dissimilar monomers have contributed hydrophilic groups to the final resin.

*Example IV*

12 grams maleic anhydride, 17 grams styrene, 20 grams divinyl ether (crude), 150 grams xylol and 0.2 gram benzoyl peroxide were heated ¾ hour at 90°–100° C. 25.5 grams of fluffy powder were produced. This was dissolved in dilute ammonia; a thick solution resulted. This solution at solids of 0.9% required 9 minutes to discharge from the 25 cc. pipette. This cross linked resin which is soluble in dilute ammonia gives much thicker solutions than the original copolymer of maleic anhydride and styrene (made under the same conditions as the cross linked resin) without cross linking agent, which discharged in an 8% T. S. solution from the 25 cc. pipette in 45 seconds, i. e. it was little more viscous than water.

In the present example maleic anhydride is used to furnish groups to the copolymer which may be readily made hydrophilic, as by treatment with alkali, while the styrene furnishes hydrophobic groups. The cross linking agent is a divinyl ether. Xylol functions as the solvent to keep the molecular weight low enough so that the polymer will be water soluble while benzoyl peroxide again functions as a catalyst. The ammonia treatment results in opening the anhydride ring and forming the soluble ammonia salt of the polymer.

It will thus be seen that there has been provided by this invention a novel method and novel compositions of matter in which the various objects herein above set forth are succesfully achieved. As various possible embodiments might be made of the compositions of the above invention and as the procedure herein described may be varied in various parts, all without departing from the scope of the invention, it is to be understood that all matter hereinbefore set forth is to be interpreted in illustrative and not in a limiting sense.

It is recognized that the materials of the examples hereinbefore given are chemical unsaturated, the degree of unsaturation depending upon the conditions of the reaction and the type and amounts of cross linking agents used. The unsaturation may be reduced by heating in air, blowing with oxygen, halogenating or hydrogenating.

I recognize that different results are obtainable in the cross linking, i. e. long molecules slightly cross linked, or short molecules highly cross linked may be formed. Equivalent viscosities may thus be obtained in solutions having widely different flow properties.

This application is a continuation-in-part of my copending application Serial No. 497,221, filed August 3, 1943, now abandoned.

Having thus described the invention, what I claim as new and desire to secure by Letters Patent of the United States is:

1. The process of producing a resin capable of forming thickened aqueous solutions at low concentrations and which gels in water at a total solids concentration as low as 1.2% which comprises refluxing 100 parts by weight of vinyl acetate, 10 parts by weight of maleic anhydride, 4 parts by weight of linseed oil and 0.2 part by weight of benzoyl peroxide for one hour and dissolving the resultant white powder in a dilute ammonia solution.

2. The process of producing a resin capable upon hydrolysis of forming thickened aqueous solutions at low concentrations and which gels in water at a total solids concentration as low as 1.2% which comprises refluxing 100 parts by weight of vinyl acetate, 10 parts by weight of maleic anhydride, 4 parts by weight of linseed oil and 0.2 part by weight of benzoyl peroxide for one hour.

3. The process of producing a resin capable of forming thickened aqueous solutions at low concentrations and which gels in water at a total solids concentration as low as 1.2% which comprises polymerizing a major portion of vinyl acetate, a minor proportion of maleic anhydride on a molal basis within the range of 10% to 40% of the vinyl acetate and a quantity of linseed oil on a molal basis within the range of 1% to 25% of the vinyl acetate in the presence of benzoyl peroxide as a catalyst, and hydrolyzing the anhydride groups in the resultant polymer, the quantity of maleic anhydride being sufficient to form a polymer soluble in water when the anhydride groups of the resultant polymer are hydrolyzed and the quantity of linseed oil being insufficiently high to form a water insoluble resin but sufficiently high to form a resin which gels in water at low concentrations of resin as low as 1.2%.

4. The process of producing a resin capable of forming thickened aqueous solutions at low concentrations and which gels in water at slightly higher concentrations which comprises polymerizing a ploymerizable vinyl monomer containing a single olefinic group in the molecule from the group consisting of vinyl esters and styrene with a quantity of maleic anhydride on a molal basis within the range of 10% to 40% of the vinyl monomer and a quantity of a crosslinking agent containing two aliphatic carbon to carbon double bonds on a molal basis within the range of 1% to 25% of the vinyl monomer, in the presence of a polymerizing catalyst and treating the resultant polymer with a quantity of an alkaline hydrolyzing agent effective to hydrolyze the anhydride groups therein to hydrophilic groups, the quantity of maleic anhydride being sufficient to form a polymer soluble in water when the anhydride groups of the resultant polymer are hydrolyzed with an alkali and the crosslinking agent being employed in a quantity effective to form a resin which gels but is not completely insoluble in water.

5. The process of producing a resin capable upon hydrolysis of forming thickened aqueous solutions at low concentrations and of forming gels in aqueous ammonia solutions at slightly higher concentrations which comprises polymerizing a polymerizable vinyl monomer containing a single olefinic group in the molecule with maleic anhydride and a quantity of a cross-linking agent containing two aliphatic carbon to carbon double bonds, in the presence of a polymerizing catalyst, the quantity of maleic anhydride on a molal basis being within the range of 10% to 40% of the vinyl monomer and effective to form a polymer soluble in water when the anhydride groups are hydrolyzed and the quantity of the cross-linking agent on a molal basis being within the range of 1% to 25% of the vinyl monomer and being effective to form a resin which gels in an aqueous solution of ammonia, and hydrolyzing the resultant polymer with an aqueous ammonia solution.

6. The process of producing a resin at least partially soluble in water and capable of forming thickened aqueous solutions at low concentrations and of forming gels in aqueous solutions of an alkaline hydrolyzing agent at slightly higher concentrations which comprises polymerizing a polymerizable vinyl monomer containing a single olefinic group in the molecule from the group consisting of vinyl esters and styrene, a compound from the group consisting of maleic anhydride and vinyl cyanide containing a

linkage and a hydrophobic group hydrolyzable by alkalies to a hydrophilic group, and a quantity of a cross-linking agent containing two aliphatic carbon to carbon double bonds, and hydrolyzing the polymer, the quantity of said second named compound on a molal basis being at least 10% of the vinyl monomer and sufficient to form a polymer at least partially soluble in water when the hydrophobic groups therein are hydrolyzed to hydrophilic groups, and the quantity of the cross-linking agent on a molal basis being at least 1% of the vinyl monomer but insufficient to confer water insolubility on the resultant polymer, the quantity of said cross-linking agent available for said polymerization after allowing for the reaction between the hydrolyzable constituent and the vinyl monomer being not more than 25% of the vinyl monomer on a molal basis.

7. The product resulting from the process of claim 1.

8. The products resulting from the process of claim 3.

9. The products resulting from the process of claim 6.

10. The process of producing a resin at least partially soluble in water and capable of forming thickened aqueous solutions at low concentrations and of forming gels in aqueous ammonia solutions at slightly higher concentrations which comprises polymerizing a polymerizable vinyl monomer containing a single olefinic group in the molecule from the group consisting of vinyl esters and styrene, maleic anhydride, and a quantity of a cross-linking agent containing two aliphatic carbon to carbon double bonds and hydrolyzing the polymer, the quantity of maleic anhydride being at least 10% of the vinyl monomer and sufficient to form a polymer at least partially soluble in water when the anhydride groups therein are hydrolyzed to carboxylic acid groups, the quantity of the cross-linking agent on a molal basis being at least 1% of the vinyl monomer but insufficient to confer water insolubility on the resultant polymer, the quantity of said cross-linking agent available for said polymerization after allowing for the reaction between the maleic anhydride and the vinyl monomer being not more than 25% of the vinyl monomer on a molal basis, and the total molal quantity of the cross-linking agent and maleic anhydride being at least 25% but less than 50% of the vinyl monomer.

11. The process of producing a resin capable of forming thickened aqueous solutions at low concentrations and which gels in water at a total solids concentration as low as 1.2% which comprises heating 157 parts by weight of vinyl acetate, 23.5 parts by weight of maleic anhydride, 35 parts by weight of divinyl ether and 0.2 part by weight of benzoyl peroxide for one hour at 65° C. and dissolving the resultant white powder in a dilute ammonia solution.

12. The process of producing a resin capable of forming thickened aqueous solutions at low concentrations and which gels in water at a total solids concentration as low as 1.2% which comprises refluxing 78 parts by weight of vinyl acetate, 12 parts by weight of maleic anhydride, 10 parts by weight of isoprene, 300 parts by weight of ethyl acetate and 0.3 part by weight of benzoyl peroxide for two hours and dissolving the resultant white precipitate in a dilute ammonia solution.

13. The product resulting from the process of claim 11.

14. The product resulting from the process of claim 12.

15. The process of producing a resin at least partially soluble in water and capable of forming thickened aqueous solutions at low concentrations and which gels in water at a total solids concentration as low as 1.2% which comprises polymerizing a major portion of a polymerizable vinyl monomer from the group consisting of vinyl acetate and styrene, a minor proportion of maleic anhydride on a molal basis within the range of 10% to 40% of the vinyl monomer and a quantity of a drying oil on a molal basis within the range of 1% to 25% of the vinyl monomer in the presence of benzoyl peroxide as a catalyst, and hydrolyzing the anhydride groups in the resultant polymer by treatment with an alkali sufficiently to open the anhydride ring and form a salt of the polymer, the quantity of maleic anhydride being sufficient to form a polymer partially soluble in water when the anhydride groups of the resultant polymer are hydrolyzed and the quantity of drying oil being insufficiently high to form a water insoluble resin but sufficiently high to form a resin which gels in water at low concentrations of resin as low as 1.2%, the total molal quantity of said maleic anhydride and said drying oil being at least 25% but less than 50% of the vinyl monomer.

JOHN C. WILLIAMS.

References Cited in the file of this patent

UNITED STATES PATENTS

| Number | Name | Date |
|---|---|---|
| 2,047,398 | Voss et al. | July 14, 1936 |
| 2,279,885 | D'Alelio | Apr. 14, 1942 |
| 2,313,728 | Austin et al. | Mar. 16, 1943 |
| 2,340,110 | D'Alelio | Jan. 25, 1944 |
| 2,346,858 | Mighton | Apr. 18, 1944 |
| 2,409,861 | Hunter et al. | Oct. 22, 1946 |

FOREIGN PATENTS

| Number | Country | Date |
|---|---|---|
| 598,732 | Germany | June 16, 1934 |